(12) United States Patent
Fippel et al.

(10) Patent No.: US 9,507,839 B2
(45) Date of Patent: Nov. 29, 2016

(54) METHOD FOR DETERMINING A SUPPORTED CONNECTIVITY BETWEEN APPLICATIONS

(75) Inventors: Bernhard Fippel, Heidelberg (DE); Siar Sarferaz, Speyer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/604,170

(22) Filed: Sep. 5, 2012

(65) Prior Publication Data
US 2013/0036094 A1 Feb. 7, 2013

Related U.S. Application Data

(63) Continuation-in-part of application No. 12/888,944, filed on Sep. 23, 2010, now Pat. No. 8,489,542.

(30) Foreign Application Priority Data

Sep. 6, 2011 (EP) .................................... 11180258

(51) Int. Cl.
| | |
|---|---|
| *G06F 17/30* | (2006.01) |
| *G06Q 10/06* | (2012.01) |
| *G06Q 10/10* | (2012.01) |
| *G06Q 30/00* | (2012.01) |

(52) U.S. Cl.
CPC ... *G06F 17/30569* (2013.01); *G06F 17/30067* (2013.01); *G06Q 10/06* (2013.01); *G06Q 10/10* (2013.01); *G06Q 30/01* (2013.01); *G06F 17/30286* (2013.01); *G06F 17/30595* (2013.01); *G06F 17/30961* (2013.01)

(58) Field of Classification Search
CPC ..................... G06F 17/30011; G06F 17/3056; G06F 17/30867; G06F 17/30398; G06F 17/30569; G06F 17/30592; G06F 17/3089; G06F 17/30893; G06F 17/30067; G06F 17/30286; G06F 17/30595; G06F 17/30961
USPC ................................ 707/756, 779, 792, 803
See application file for complete search history.

(56) References Cited

U.S. PATENT DOCUMENTS

| | | | | |
|---|---|---|---|---|
| 7,386,855 | B2 * | 6/2008 | Song ....................... | H04L 29/06 719/310 |
| 7,665,064 | B2 * | 2/2010 | Able et al. ..................... | 717/117 |
| 7,756,820 | B2 * | 7/2010 | Moore et al. .................. | 707/600 |
| 7,827,563 | B2 | 11/2010 | Westervelt et al. | |
| 8,387,076 | B2 * | 2/2013 | Thatte et al. ................. | 719/328 |
| 8,707,412 | B2 * | 4/2014 | Boulos .................... | G06F 21/33 726/8 |
| 2004/0243587 | A1 * | 12/2004 | Nuyens et al. ............... | 707/100 |
| 2005/0083954 | A1 * | 4/2005 | Meyer-Grafe ................ | 370/403 |
| 2006/0106945 | A1 | 5/2006 | Westervelt et al. | |
| 2006/0236306 | A1 | 10/2006 | DeBruin et al. | |
| 2007/0255718 | A1 | 11/2007 | Baikov et al. | |
| 2008/0017722 | A1 | 1/2008 | Snyder et al. | |
| 2008/0168102 | A1 | 7/2008 | Parimi | |

(Continued)

*Primary Examiner* — Pierre Vital
*Assistant Examiner* — Andalib Lodhi
(74) *Attorney, Agent, or Firm* — Jones Day

(57) ABSTRACT

A computer-implemented system and method that analyzes metadata of the first application to identify a first data object and one or more first fields of the first data object, the first data object and the first fields being part of the metadata of the first application, identifies one or more second applications having a second data object with one or more second fields, and determines, for at least one of the second applications, a supported connectivity with the first application and whether the supported connectivity is a point-to-point connectivity or a connectivity through a central design time repository.

21 Claims, 8 Drawing Sheets

(56) References Cited

U.S. PATENT DOCUMENTS

| | | |
|---|---|---|
| 2008/0189206 A1 | 8/2008 | Choi et al. |
| 2008/0189679 A1* | 8/2008 | Rodriguez et al. ........... 717/105 |
| 2009/0125883 A1* | 5/2009 | Barsness et al. ............. 717/119 |
| 2010/0023943 A1 | 1/2010 | Arthurs et al. |
| 2010/0146035 A1 | 6/2010 | Matsa et al. |
| 2013/0080642 A1* | 3/2013 | Adam et al. .................. 709/226 |

* cited by examiner

FIG. 5

| Name | Category | Type | Occurr |
|---|---|---|---|
| ▶ SalesOrderCRMConfirmation | Element | SalesOrderCRMConfirmationMessage | 1 |
| ▲ MessageHeader | Element | BusinessDocumentMessageHeader | 0..1 |
| ▼ SalesOrder | Element | SlsOrdCRMConfSlsOrd | 1 |
| ▲ ID | Element | SalesOrderID | 0..1 |
| ▲ BuyerID | Element | BusinessTransactionDocumentID | 1 |
| ▲ ProcessingTypeCode | Element | BusinessTransactionDocumentProcessingTypeCode | 0..1 |
| ▲ DataOriginCategoryCode | Element | CustomerTransactionDocumentDataOriginCategoryCode | 0..1 |
| ▲ Date | Element | Date | 0..1 |
| ▲ BuyerDate | Element | Date | 0..1 |
| ▲ Name | Element | MEDIUM_Name | 1 |
| ▲ SystemAdministrativeData | Element | SlsOrdCRM_sSystAdminvData | 0..1 |
| ▲ Status | Element | SlsOrdCRMConfSts | 1 |
| ▲ SalesAndServiceBusinessArea | Element | SlsOrdCRMConfSlsSrvcBusArea | 0..1 |
| ▲ BuyerParty | Element | SlsOrdCRMConfBuyrPty | 0..1 |

METHOD FOR DETERMINING A SUPPORTED CONNECTIVITY BETWEEN APPLICATIONS

This application claims the benefit of European Patent Application No. 11180258.3 filed on Sep. 6, 2011, which is incorporated herein by reference. This application is also a continuation-in-part of U.S. application Ser. No. 12/888,944, which is incorporated herein by reference.

BACKGROUND OF THE INVENTION

1. Field of the Invention

The present invention relates to computer systems, and more particularly, to an improved computer system for operating a distributed system landscape.

2. Discussion of the Related Art

Organizations use enterprise computing systems to manage different business processes through customizable applications that interact with each other. For example, enterprise resource planning (ERP) systems are computer-based systems that manage an organization's assets, financial resources, materials, and personnel. A distributed system landscape, such as an ERP system landscape, may include several different application components that may share data with each other. These application components may include a customer relationship management (CRM) system, an ERP application system, a warehouse management system, and a decision support system.

Existing ERP systems include a central design time repository that is accessible to each application component of the ERP system landscape. Content objects that are used in each application component are initially developed for mandatory inclusion in the central design time repository. Content objects identify fields, structure, and sources of data used in the application. This information may be stored as metadata in the central design time repository. Each time a new application is added to an ERP system landscape, the corresponding content objects used in the application must also be added to the central design time repository. If the content objects of a particular application are not added to the central design time repository, the application may not be able to exchange data with other applications within or outside the ERP system landscape.

The central design time repository requirement in existing ERP system landscapes has several disadvantages. First, because content objects used in applications must be added to the central design time repository, developers writing new applications must also create content object metadata for inclusion in the central design time repository. This is cumbersome and inefficient for developers who may be familiar with certain programming languages used to create their application but not familiar with the structure or programming of the central design time repository, as the developers must invest additional resources in creating the content object metadata. Typically, the developers trying to integrate the various applications into one common ERP system landscape of a particular company are familiar with the programs for operating business workflows of the company, but are not familiar with the operation and maintenance of the central design time repository typically provided by IT-companies.

Additionally, the requirement also creates additional shipment and installation inefficiencies. This is because two separate shipment channels and installations may be needed to incorporate the new application in an ERP system. The first shipment channel may include software and/or hardware containing the new application, which may be installed as a separate system or as part of an existing system. The second shipment channel may include the application specific content object metadata for inclusion in the central design time repository. Aside from installing the application itself on an application system, the content object metadata must also be installed on the separate repository system storing the central content repository. Two shipment channels are typically used because the central design time repository system is structurally distinct from the application systems and also often located in another region.

This existing approach is disadvantageous, as two shipment channels per application are required in order to distribute generated runtime objects as well as a corresponding configuration to a computer system operated by a customer.

In state-of-the-art systems, applications are provided to first processing system(s) of the distributed system landscape via a first shipment channel. The metadata required by each application to communicate data via the central design time repository is transferred to the central design time repository via a second shipment channel. Thus, each customer operating a distributed system landscape comprising a plurality of applications and the central design time repository is required to manage to related data packages being received via two different shipment channels. This is highly inefficient and error-prone. In addition, according to many state-of-the-art systems, a developer developing an application for use within a distributed system landscape is required to use a different development suite for specifying the metadata of an application and for developing or adapting the application. Switching between different development environments is perceived by most developers as highly inconvenient and inefficient, because development environments tend to be highly complex software applications and require a lot of work and time in order to get used to the tools provided by each development environment.

FIG. 1 shows a configuration of an existing distributed system landscape 100 including a plurality of applications 110, 120, 130, 160, 180, herein also referred to as 'application systems'. This distributed system landscape 100 may be, for example, an ERP system landscape. The ERP system landscape may have originally included a CRM application system 110, an ERP application system 160, and a central design time repository 101 storing content objects 111 and 161 for CRM system 110 and ERP application system 160, respectively. During runtime, the CRM 110 and ERP application 160 systems may communicate with the central design time repository 101 to access the content objects 111 and 161 associated with the respective application system 110 and 160. This communication of the depicted state of the art system is necessary because each of the content objects 111 and 161 identify fields, structure, and sources of data used in the respective application 110 and 160.

Once the ERP system landscape 100 has been deployed, developers may develop new applications or application upgrades or organizations may decide to addition functionality to their ERP system landscape 100. For example, a developer may release a new version 2.0 of a CRM system 120, followed later by an even newer version 3.0 of CRM system 130. Alternatively, an organization may decide to add another application component, such as a decision support system 180, to include additional functionality in its ERP system landscape 100.

However, in each of these situations, in order to fully integrate these new systems 120, 130, and 180 in the existing ERP system landscape 100, the content objects 121, 131, and 181 for each of these respective new systems must also be added to the central design time repository 101. Thus, there is a need for systems and methods where new applications added to an ERP system include self-contained content objects that do not have to be separate structured, formatted, and included in a central design time repository.

SUMMARY OF THE INVENTION

Accordingly, the present invention is directed to a system and method for determining a supported connectivity between applications that substantially obviates one or more problems due to limitations and disadvantages of the related art. Some example embodiments of the present invention and their advantages will now be described.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The features of the example embodiments may be advantageous for many reasons: on one hand, the time for developing, deploying and maintain the distributed system landscape may be reduced because embodiments of the invention may automatically determine if and how a first application can exchange data with a second application. In case it is determined that at least one application, referred herein as "point-to-point application", supports a point-to-point connectivity to the instantiated application, the metadata of the instantiated application is transferred to the point-to-point application in order to create an inbound interface. That inbound interface is used for extracting data from runtime communications formatted according to the metadata at the instantiated application. The interface may be created by the point-to-point application automatically. Thus, it is not necessary to transfer a content data object of the instantiated application to a central design time repository as required by state of the art distributed system landscapes. Avoiding to copy a content data objects to the central design time repository for enabling the installed application to communicate with the point-to-point application is advantageous, because communication overhead is avoided and communication speed is increased. This feature may be particularly advantageous for smaller companies operating a distributed system landscape comprising only a small number of applications. If the number of applications needing to exchange data with each other and with external computer systems of business partners or customers is comparatively small, a dynamically determined point-to-point communication may be highly advantageous due to the avoidance of management overhead and due to the resulting performance gain.

When it is determined that at least one application supports connectivity with an instantiated application through a central repository, the metadata of the instantiated application is 'published', i.e., transferred, to the central design time repository. The published metadata is accessed at runtime of the instantiated application to extract data from communications formatted according to the metadata. These features may be particularly advantageous for larger companies comprising a plurality of applications which need to communicate with each other. In addition, larger companies often have to exchange data with remote applications of a plurality of business partners and customers. Due to the tremendously increasing number of theoretically possible pairs of communication partners, it may not be possible to support a direct point-to-point communication between any of the possible pairs of applications. Therefore, exchanging data between two applications via a central design time repository acting as a hub may be particularly advantageous for larger companies and complex distributed system landscapes.

The automated publishing of metadata to the central design time repository may also be highly advantageous, because that feature allows using only one single shipment channel for establishing connectivity via a central hub between two applications of a distributed system landscape. The metadata is transferred to the processing system(s) operating the instantiated application as a part of the application. For example, the application comprising the metadata may be downloaded from a website. Then, the downloaded application is instantiated. In case the application determines that at least one other application supports connectivity with the instantiated application via a central design time repository, the metadata is transferred from the instantiated application to the central design time repository. The transfer may be triggered automatically as a result of the determination or may be executed semi-automatically after a user has explicitly approved the publishing of the metadata to the central design time repository.

Providing the metadata of an application as part of that application tremendously facilitates the task of developing an application being operable to communicate with other applications within or outside the distributed system landscape. In addition, these features allow for a reduction of metadata stored to the central design time repository compared to state-of-the-art system, thereby reducing memory and processing power consumption of the central design time repository. According to state-of-the-art systems, the metadata corresponding to each application is transferred via the second shipment channel per default to the central design time repository. In many cases, this is not necessary, because a particular application may have been instantiated at a customer together with a plurality of other applications which are or not operable to share a data object and corresponding fields with the instantiated application. In the cases, transferring metadata via a second channel to the central design time repository is completely unnecessary because the transferred metadata does not empower the instantiated application to communicate with any of the other applications. By bundling metadata of an application within the application and by automatically or semi-automatically transferring the metadata to the central design time repository only in case at least one further application supporting connectivity with the instantiated application is determined, it can be ensured that the central design time repository comprises only that kind of metadata which is really necessary for allowing the instantiated applications to communicate with each other. This also facilitates the process of setting up and maintaining such a distributed system landscape: the operator does not have to decide which kind of metadata should be published given a particular set of instantiated applications. In particular for large companies operating hundreds of different applications in a distributed system framework, the number of theoretically available pairs of applications being operable to communicate with each other may be huge and maintaining such a system with state of the art tools is complex and error prone. According to embodiments of the invention, a user is prompted during or after the installation of an application for specifying address information of a lookup table, the lookup table comprising identifiers of all other installed applications and comprising respective data objects and fields. By connecting to the lookup table and analyzing its contents, each application may automatically determine whether one or more other applications have been installed in the distributed system landscape and support a point-to-point communication or a communication based on the central design time repository.

According to an example embodiment, the metadata is stored in a WSDL format as an integral part of the application. The metadata may be made available to other installed applications. These features may be advantageous as a first application may use the lookup table in order to identify a second application supporting a point-to-point connectivity with the first application. The first application comprising first metadata provides the first metadata including a first data object and first data object fields to the second application. Thus, the second application is operable to create an inbound interface for extracting data from communications which are formatted according to the first metadata of the first application. Thus, the first application is empowered to send data to the second application which can be interpreted and processed by the second application automatically.

According to an example embodiment, the metadata is converted from a WSDL format of the application to that of the repository system before transferring and storing the published metadata in the central design time repository. These features feature may be advantageous, because the WSDL format is a flexibly modifiable and widely used standard enabling humans as well as computer implemented methods to read and interpreted its content.

According to an example embodiment, the metadata is converted from the WSDL format of the first application into a format of the central design time repository before the published metadata is stored in the central design time repository. This may be advantageous as it facilitates the central design time repository to manage the metadata of a plurality of applications and make this metadata available to the plurality of applications.

According to an example embodiment, the first and the second applications are respectively operable to operate in a point-to-point communication mode and in a central-design time based communication mode. The method further includes at runtime of the first and second applications, checking a configuration setting of the first application by the first application, the configuration settings of each of the first and the one or more second applications respectively specifying different connectivity modes for different communications between pairs of applications selected from any of the first and second applications in case the configuration settings of the first application specifies a point-to-point connectivity mode for the first application and the at least one second application, sending by the one first application a first message to the at least one second application, and receiving by the first application via its automatically created inbound interface a second message from the at least one second application in response to the first message, the inbound interface being operable to extract predetermined data from the second message using the metadata of the at least one application, and in case the configuration settings of the first application specifies a central design time repository based connectivity mode for the first application and the at least one second application, retrieving metadata of the at least one second application by the first application from the central design time repository, the retrieved metadata allowing the first application to create and format a third message according to the requirements of the at least one second application and to send the third message to the at least one second application. These features may be advantageous because evaluating a configuration setting for dynamically determining a process-specific communication mode may provide for a highly dynamic, flexibly configurable and still automatically operative distributed system landscape which eases the task of maintaining and setting up the distributed system landscape and the communications between its component applications.

According to an example embodiment, the method further comprises processing point-to-point communications through an outbound interface before sending them to the other application. Thereby, the outbound interface excludes, i.e., filters out, at least some data not used by the other application. One advantage of these features is that it reduces the amount of data transferred to the other application and may therefore increase response time and reduce network traffic.

According to an example embodiment, the metadata is stored hierarchically, with a first level identifying a messaging object transmitted between applications, a second level identifying a data object having a data field with data transmitted as part of the messaging object, and a third level identifying the data field associated with the transmitted data. The structure may be advantageous as it helps to automatically identify data to be included in the communication and allows an inbound interface to extract data by using the data structure specified in the metadata. For example, the identified messaging object may relate to a particular XML document, the identified data object may relate to an entity instance such as 'machine123' and the data fields associated with data may relate to 'location=room456', 'productivity=44 per year', 'temperature=23° C.' and the like. The format of the association may depend on the format of the messaging object.

According to an example embodiment, the method further comprises, for the at least one application supporting point-to-point connectivity, creating an inbound interface for each application supporting point-to-point connectivity. The inbound interface is operable to extract desired data after reading metadata of each respective application. The metadata is read to identify a field of a data object containing the desired data. In other words, according to an example embodiment, the at least one application supporting point-to-point connectivity receives metadata from the at least one point-to-point application, evaluates the metadata for determining data to be filtered out by an outbound interface of the first application before sending, by the outbound interface, data to the point-to-point application. These features may be advantageous as they allow reducing the data to be communicated dynamically. This reduces network traffic when sending data from the first application to the at least one point-to-point application.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 illustrates a structure of content object metadata according to an example embodiment of the present invention;

DETAILED DESCRIPTION OF THE INVENTION

Figure 1:
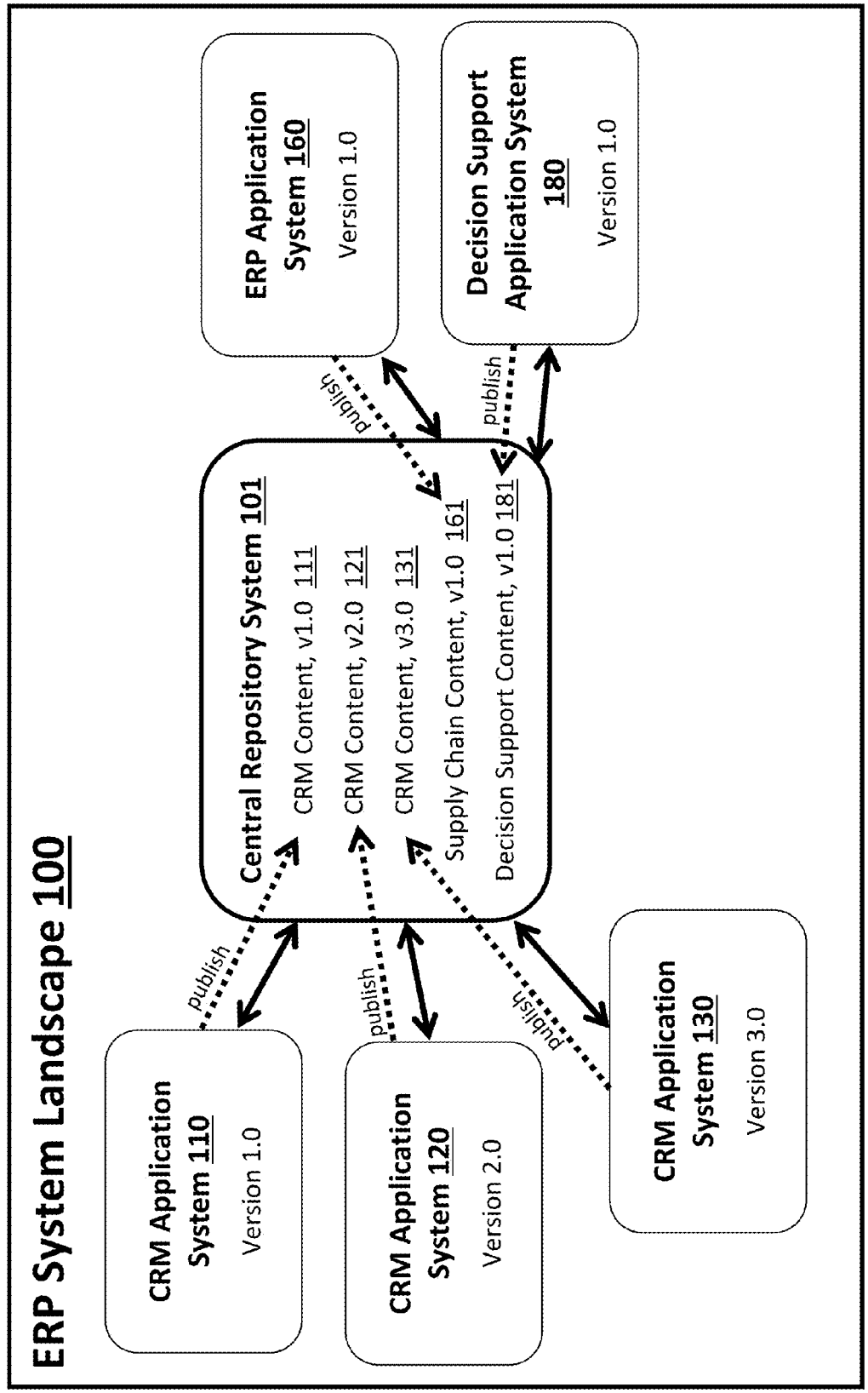
FIG. 1 illustrates a configuration of a distributed system landscape according to the related art.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Prior to describing the present invention in detail, some terms of art will now be described.

A "distributed system landscape" includes a distributed computer system including a plurality of applications and a central design time repository. Some of the applications may be operable to communicate with each other. An example of a distributed system landscape is the SAP business suite environment.

A "shipment channel" includes any communication channel for transferring electronic data, in particular runtime data objects and metadata. Transferring data via a shipment channel may comprise burning data on a non-transitory storage medium, e.g., a CD-ROM or a FLASH drive, and delivering the storage medium to an operator of the target computer system. Transferring electronic data via a shipment channel may also include downloading data provided by a source computer system, e.g. via a web site, to a target computer system, the download being triggered by a selection of an operator of the target computer system. A shipment channel may also be based on a web service interface allowing the target computer system to request data from a source computer system via the interface.

A "content object" includes a data object. According to some embodiments, a content object is a data object consisting mainly of metadata of a particular content type. A content type can be, for example, a particular entity type such as 'customer', 'sales order', 'machine type A', machine type B' or the like. The availability of a content object comprising metadata of a particular entity may be a prerequisite within the context of a distributed system landscape such as the SAP Business Suite Environment for exchanging instances of the entity between two different application programs.

"Metadata" includes data specifying the structure of a data object, specifying standards and protocols used for establishing a communication connection with a particular application and/or for exchanging data with the application. Metadata may specify, for example, a complex data type such as 'SalesOrderConfirmation' comprising a plurality of attributes. The attributes may be organized within the data object hierarchically. For example, the metadata of a data object may specify a data structure used for storing and/or communicating the data object.

An "inbound interface" includes an interface of an application enabling the application to receive data from other applications. An "outbound interface" of an application is an interface enabling the application to send data to other applications.

Communications between applications that depend on central design time repository metadata, such as encryption related communications and certain business-to-business communications, may still be supported by the publishing mechanism.

Figure 2:
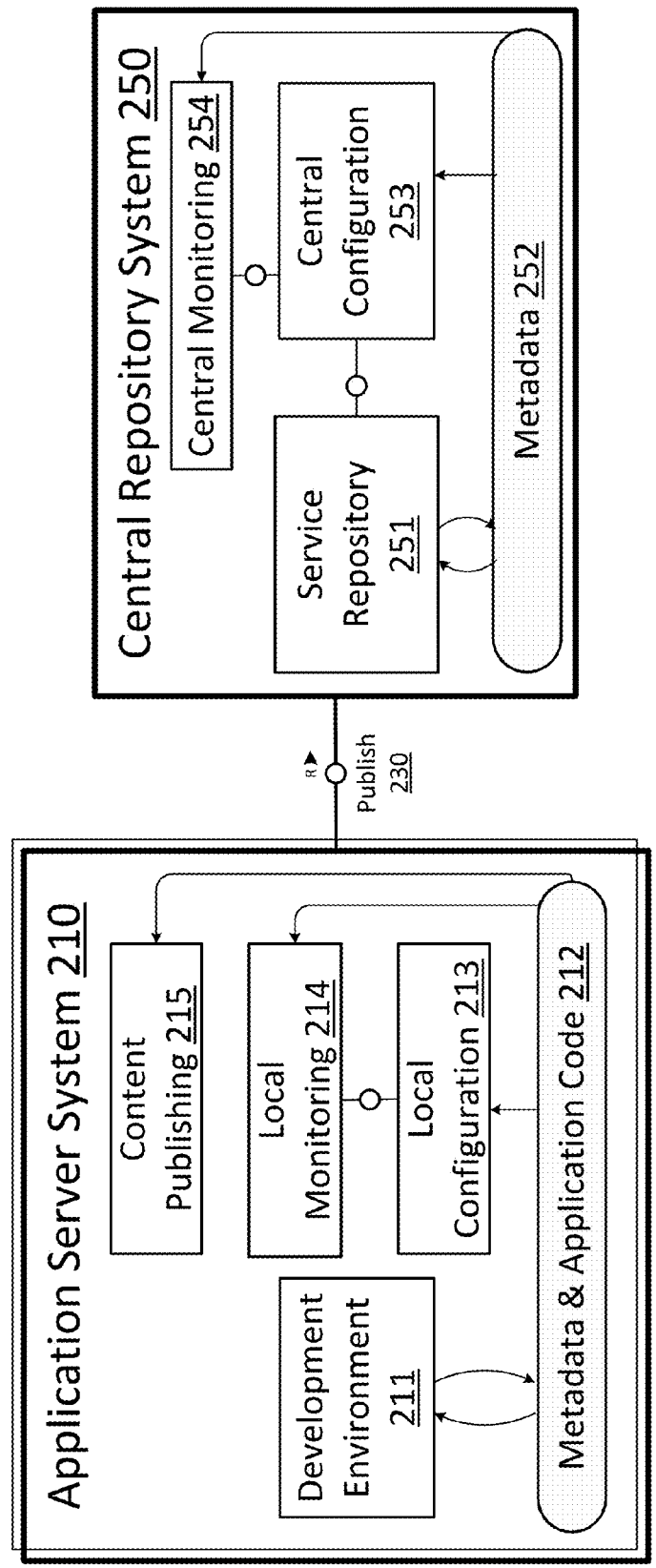
FIG. 2 illustrates an architecture according to an example embodiment of the present invention.

FIG. 2 illustrates an architecture according to an example embodiment of the present invention, including the components interacting with the content publishing mechanism. The example architecture may include an application server system 210 and a central design time repository 250. The application 210 may include a development environment 211, metadata and code memory 212, local configuration information 213, local monitoring 214, and a content publishing mechanism 215.

The content publishing mechanism 215 may transfer content object metadata between different applications 210. This transfer of metadata between systems may enable the connectivity and data sharing between the systems. If the metadata 212 in each application 210 is stored in a same format, such as standard WSDL format, the publishing module 215 may initiate a direct transfer of content object metadata between applications 210. If the formats are different, among others the content publishing mechanism 215 may be used to create an inbound interface corresponding to an existing outbound messaging interface of another application to enable processing of received data.

The content publishing mechanism 215 may take the metadata 212 in the application 210 and transform the metadata into a format recognized by a central design time repository 250 or other system if operating in a point-to-point mode. The monitoring and configuration modules 214, 251, 213, 253, may be used to identify the proper format for each system and may enable the same metadata 212 to be reused with different systems having different formats by identifying the proper format for each system. The publishing module 215 may then take the transformed metadata and publish 230 it to the central design time repository 250 or other system using an asynchronous enterprise service, such as a Simple Object Access Protocol (SOAP) message transmitted using Hypertext Transfer Protocol (HTTP) or secure HTTP. In some instances the publishing module may transfer metadata synchronously depending on the configuration of the system. In instances where the metadata stored in the central design time repository 250 is in the same format as in the application 210, no transformation may be need and the metadata may be simply transferred to the repository system 250.

According to some embodiments, the development environment 211 may be used to develop new enterprise services. During development of these new services, application code and/or metadata may be created to execute the new services at runtime. The created application code and/or metadata may be stored in memory 212. Code and metadata stored in the memory 212 may also be reused when developing new services in the development environment 211. Metadata that is stored in the memory 212 may be stored in a standard web services definition language (WSDL) format. The created metadata may define fields, objects, and other data used when executing the corresponding application code.

The application 210 may also be configured for point-to-point and central design time repository based communications with other applications. Local configuration settings 213 may be customized to determine when point-to-point and central design time repository based communications may be used by content publishing mechanism 215. For example, local configuration settings 213 may include identifiers of applications supporting point-to-point communications and/or central design time repository based communications. Local configuration settings 213 may include conditions in which one of the communications protocols is to be used, such as using central design time repository based communications for encrypted communications or business-to-business communications. Local configuration settings 213 may also include formatting instructions for structuring point-to-point messages to be compatible with other applications or decoding messages received from other applications.

According to some embodiments, a local monitoring module 214 may interface with the local configuration settings 213 and monitor outbound and inbound messages to ensure compliance with the local configuration settings 213. Local monitoring module 214 may generate an error if unsupported messages are received at the application server system 210. Local monitoring module 214 may send instructions to other applications to switch to or use a particular type of communication, such as point-to-point communication, specified in the local configuration settings 213. Local monitoring module 214 may also monitor communications received from other applications specifying a type of communication, such as central design time repository based communications, used by the other application. The local monitoring module 214 may then ensure that subsequent communications with that application comply with the specified communication type, provided the local configuration setting 213 do not conflict.

In some embodiments, the central design time repository 250 may include a service repository 251, metadata 252, central configuration module 253, and a central monitoring module. The service repository 251 may be used to organize and structure metadata 252 stored in the central design time repository 250. The service repository 251 may include tools and programs to parse metadata received from a content publishing module 215 and add the parsed metadata to the central design time repository metadata 252 in accordance with the structure used in the central design time repository 250. Metadata 252 that is stored in the repository system 250 may be stored in a standard web services definition language (WSDL) format in some embodiments, though other embodiments may use different formats. The created metadata may define fields, objects, and other data used by different applications 210.

In some embodiments a central configuration module 253 is used to set and store configuration settings of the central design time repository 250. These configuration settings may be used to determine the structure, format, and tags used in the metadata 252. The configuration settings may also determine which applications may interface with the central design time repository 250, the allowable formats of published 230 metadata content sent to the content repository system 250, and the conditions under which an application 210 may used the central design time repository 250. For example, central configuration module 253 settings may include identifiers of applications supporting central design time repository based communications. Central configuration module 253 settings may restrict central design time repository 250 communications to applications systems 210 engaging in encrypted communications or business-to-business communications.

According to some embodiments, the central monitoring module 254 interfaces with the central configuration module 253 settings to ensure compliance with the central configuration settings. Central monitoring module 254 may generate an error if unsupported content is published to the central design time repository 250. Central monitoring module 254 may send instructions to other applications to switch to or use a particular type of format when sending published content.

Figure 3:
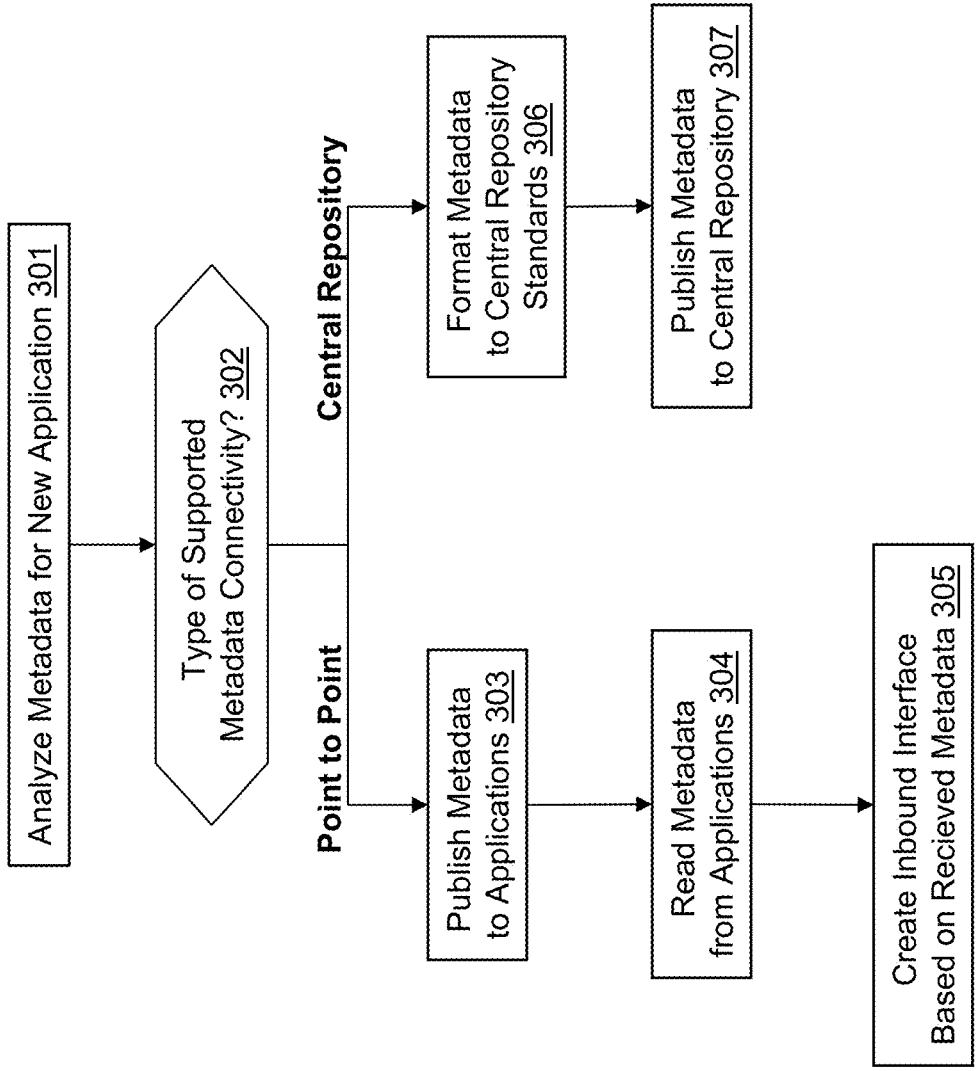
FIG. 3 illustrates a design time method according to an example embodiment of the present invention.

FIG. 3 illustrates a design time method according to an example embodiment of the present invention. Once a new application component or functionality has been created, such as in the development environment 211 for example, content object metadata defining fields, objects, and other data used by the new component may be included in the metadata memory of the application 210. In block 301, this metadata may be analyzed to identify other applications supporting interactivity with the fields and objects in the metadata. During this analysis, the fields and objects in the metadata may be identified. Additionally, the properties of other applications associated with the ERP system may be analyzed to determine which, if any, of the other applications support the identified field and objects.

This determination may be made by analyzing whether the other applications use similar fields and objects in a same context. For example, if a CRM application uses a customer id field in a sales order object to identify the customer purchasing an item and another application uses a customer id field to in an order fulfillment object to identify a customer receiving an item, then the customer id field in both applications may be used in the same context. A determination of whether fields are used in a same context may depend on the object and application in which the field is used. Logic and/or lookup tables may also be used to determine similar contexts of fields. Fields may also have different identifiers in different applications. For example, a customer id field may have an identifier "customer id" in one application but the same field may have an identifier "customer name" in another application. A lookup table may be used in these situations to identify similar fields with different names.

Once the analysis is complete and those other applications supporting the fields and objects in the metadata have been identified, a determination may be made as to the type of connectivity supported by the identified other applications in box 302. The primary types of connectivity may include point-to-point connectivity and central design time repository based connectivity, as discussed previously.

Point-to-point connectivity may be selected when another application includes an outbound point-to-point interface for the identified similar fields and objects corresponding to those in the new application component metadata. If no such interface exists, then central design time repository based connectivity may be selected. Alternatively, a lookup table may be used to determine the type of connectivity between different applications. Tags or other identifiers may also be included in different applications to identify those applications supporting point-to-point communications. The tags or other identifiers may also be used to determine the type of connectivity to be used. Connectivity information may be stored in the local configuration module 213 settings of the application 210.

If point-to-point connectivity is selected for communications with at least one of the other applications, then in box 303, the application with the new application component metadata may publish the metadata to those other applications with point-to-point connectivity. Publication may occur by making available the pertinent WSDL metadata stored in the application to those other systems supporting point-to-point connectivity. The other systems supporting point-to-point connectivity may then use the metadata to create inbound interfaces. The inbound interfaces enable the other systems to properly identify data transferred during runtime through point-to-point communications.

In box 304, the application with the new application component may also read the identified similar field and object metadata in those other applications and in box 305, the application may create, based on the read metadata, inbound interfaces for processing and properly identifying data received from those other systems during point-to-point communications.

If central design time repository based connectivity is selected for communications with at least one of the other applications, in box 306, the application may reformat the metadata according to the data structure used in the central design time repository so that the metadata may be seamlessly integrated into the central design time repository with the metadata from other applications. In box 307, the metadata may be published to the central design time repository. After publication, the metadata may be added to the central design time repository.

Figure 4:
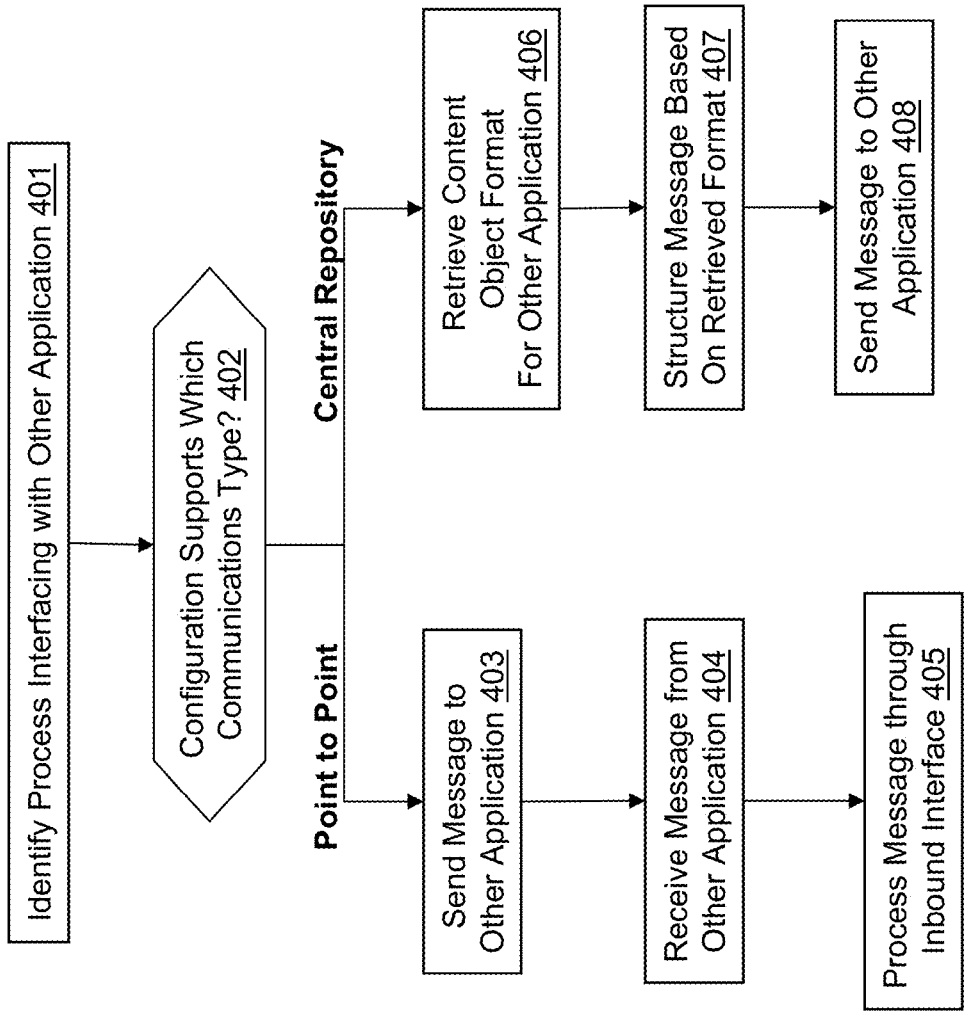
FIG. 4 illustrates a runtime method according to an example embodiment of the present invention.

FIG. 4 illustrates an example runtime method according to an example embodiment of the present invention. In box 401, when a process in a first application wants to interface with data used by another application, both the process and the other application involved in the interfacing may be identified. In other embodiments, however, only the other application may be identified and not the process triggering the interfacing. Once both the process and the other application have been identified, a determination may be made as to the type of supported communications between the systems.

In box 402, the local configuration module 213 settings may be checked to determine the communication type supported by the identified process and/or the identified other application. The local configuration module 213 settings may contain identifiers specifying the situation in which each communication type may be supported. For example, the module 213 may contain a lookup table or logic indicating that particular processes, such as all encryption processes, may use central design time repository based communications. Alternatively, the module 213 may indicate that certain applications, such as an ERP application, may support point-to-point communications. The module 213 may also include more sophisticated logic, such as logic indicating that a first process interfacing with a first application may use point-to-point communications, while a second process interfacing with the first application and a first process interfacing with a second application may use central design time repository based communications. Other settings are also possible in different embodiments.

If the local configuration module 213 settings indicate that point-to-point communications are to be used, the first application may send a message in box 403 containing object data that is to be shared with the other application. The object data in the message may be formatted according to the corresponding metadata in the first application. The other application may then identify the object data by applying the inbound interface to the object data in the message that it previously created at design time based on the metadata in the first application.

In box 404, a message containing object data from the other application may be received at the first application as part of the interfacing between applications. Once the message is received, in box 405 it may be processed through an inbound interface that is generated at design time when the first application read the corresponding metadata in the other application to generate the inbound interface. Processing the received message through the inbound interface may ensure that that the object data in the message is correctly read at the first application. Once the object data has been processed the data may be used by the respective applications.

If the local configuration module 213 settings indicate that central design time repository based settings are to be used, in box 406 the first application may communicate with the central design time repository to obtain object formatting instructions from the repository for the other application. In some embodiments, the identified process and/or the identified application may be used by the central design time repository to identify the proper object formatting instructions. Other information may also be used in some embodiments.

In box 407, the first application may structure a message to the other application based on the instructions retrieved from the central design time repository. In box 408 the structured message may be sent to the other application.

According to one embodiment (not shown), a first application for controlling an assembly line of a manufacturing company is instantiated at a desktop computer of a manufacturing company. The desktop computer is operated by an IT-administrator of the company and is connected to a server hosting a central design time repository via the intranet of the manufacturing company. Upon installation of the first application, and/or, according to some embodiments, upon starting the installed first application, the administrator is prompted via a dialog window provided by the first application to specify the address of a lookup table, e.g. an IP address and port and database account information necessary to access information stored in the lookup table. The lookup-table can be, for example, a table in an MySQL or Postgre-SQL database. The lookup table comprises information on all other applications, herein referred to as 'second applications' installed on the desktop PC or any other connected PC and constituting, together with the central design time repository, the distributed system landscape of the manufacturing company. Upon instantiation of the first application, an identifier and possibly further data being descriptive of the first application is added to the lookup-table automatically, thereby allowing each of the second applications having access to the lookup-table to determine that a further application (the first application) has been added to the system landscape. The first application may comprise metadata being indicative of a first data object of the first application. The first data object may comprise the fields 'status', 'temperature', 'currently operated by' and others. The first application may automatically analyze the data in the lookup table to determine at least one of a plurality of second applications, the one determined second application sharing a semantically equivalent data object, for example, the data object 'car wheel production machine'. The semantically equivalent data object of the at least one second application may be 'Machine234' comprising all first fields and in addition some second fields such as 'age of the machine'. As the lookup-table comprises a mapping of the identifier 'car wheel production machine' and the identifier 'Machine234', the mapping being indicative of semantic equivalence of the two concepts. When instantiating the first application, the first application automatically determines, e.g. by accessing supplementary data stored in the lookup table in association with the identifier of the at least one second application, whether the at least one second application supports a point-to-point communication with the first application or whether a hub-based communication needs to be established automatically.

In case the first application automatically determined that at least one second application program exists comprising in its metadata a semantically equivalent data object 'car wheel production machine'/'machine 234' exists supporting a point-to-point communication, the first application automatically publishes its metadata to the determined second application (and optionally also to other second applications) for making the metadata available to the second application(s). Publishing the metadata of the first application is done, for example, by storing the metadata into the database comprising the lookup table. Then, the first application automatically receives the metadata of the determined second application, also referred herein as 'point-to-point application', e.g. by executing a read operation to the second application or by executing a read operation on the lookup table comprising the metadata. During or after instantiating the first application, i.e., at the design time of the first application, an inbound interface is created automatically based on the received metadata of the point-to-point application, the automatically created inbound interface allowing the first application at runtime to receive and process data submitted by the point-to-point application.

In case it is determined that alternatively to the point-to-point application or in addition to the point-to-point application, at least one second application exists comprising in its metadata a semantically related data object and supporting a connectivity based on the central design time repository, the metadata of the first application is automatically formatted according to a standard of the central design time repository. For example, in case the central design time repository supports a particular WSDL file format, the metadata of the first application, which may have the format of a property list, is transformed into the WSDL format and stored, in other words 'published' into the central design time repository. According to some embodiments, the format of metadata stored to the central design time repository is a standard for much being interpretable by all first and second applications. These features may be advantageous, because upon publishing metadata to the central design time repository, any other application is enabled to retrieve the metadata and to format data for communication with any other application according to the format requirements of the application specified in the applications' metadata.

After having determined the appropriate communication channel (point-to-point or hub-based), the first application is operable to automatically receive messages from the second application, either via the automatically created inbound interface of the first application or via a message formatted already according to the message format requirements as specified in the metadata published in the central design time repository. Thus, a distributed system framework comprising a first application being operable to receive and interpret data of at least one second application is created automatically without any intervention of the administrator.

At runtime of the first and the at least one second application, the first application may receive an error message from the at least one second application, the error message being indicative of an error of the car wheel manufacturing machine, the machine being part of the supply chain. The first application is operable to extract all relevant data from the error message by means of its automatically created inbound interface, the inbound interface using the metadata of the at least one second application for extracting relevant information and for controlling a conveyer belt delivering mechanical components to the car wheel manufacturing machine for assembling a car wheel. In case of an error of the car wheel manufacturing machine, the conveyor belt may be stopped automatically.

FIG. 5 illustrates a structure of content object metadata according to an example embodiment of the present invention. The content object metadata in this example may be included as part of the metadata 212 in application 210. The content object metadata may also be published 230 to the central design time repository 250 and included as metadata 252 in the central design time repository 250. The central design time repository metadata may have a same structure as that of the metadata 212 in the application 210 or it may have a different structure, in which case the published metadata in the application 210 may be restructured in a format compatible with the central design time repository 250.

The content object metadata shown in FIG. 5 contains identifiers of the fields, objects, and other data pertinent to a sales order confirmation message designated with the identifier SalesOrderCRMConfirmation. This metadata may be installed on a first application as part of a new application component that generates or interacts with a sales order confirmation message in a CRM application. The metadata may be arranged hierarchically, with each of the sub-elements in the sales order confirmation message shown as subordinate to the SalesOrderCRMConfirmation identifier.

In this example, the metadata may indicate data that is included in a sales order confirmation message from a CRM application. For example, the message may contain a message header, as indicated by the identifier MessageHeader, and data from a sales order object, as indicated by the identifier SalesObject. This MessageHeader identifier may be associated with a particular message header structure. Fields from the sales order object that may be included in the message may be shown as subordinate to the sales order object. In this example, the fields shown include a sales order identifier, designated by the identifier ID, along with other fields designated by the identifiers BuyerID, ProcessingTypeCode, and so on. Although the metadata in FIG. 5 is shown in a table format, the metadata may also be stored in a WSDL format.

If the first application is configured to use point-to-point communications when exchanging Sales Order Confirmation Messages with other applications, then the first application may make this metadata available to those other applications. Each of these applications may use the metadata to create inbound and/or outbound interfaces to process exchanged sales order confirmation messages between the systems. The interfaces may be used to correctly extract or include desired information in the messages. For example, if an application wants to save or update the sales order ID, the interface may be created to extract or update the sales order ID data in the message using the metadata to identify the data in the message. The interface enables applications to filter specific fields and data in messages so that only desired data in messages are processed or included in the messages.

For example, if a CRM application wants to send a point-to-point sales order confirmation to another application in the ERP system, the CRM application may use an outbound interface to structure the confirmation message based on the metadata in the CRM application. The confirmation message may then be sent direct to the other application, where it may be processed by an inbound interface to identify data in the message relevant to the other application. Both interfaces may use the same SalesOrderCRM-Confirmation metadata, but each interface may be customized to accommodate the requirements of each system.

If the first application is configured to use central design time repository based communications when exchanging Sales Order Confirmation Messages with other applications, then the first application may publish its metadata to the central design time repository. Other systems may then access the metadata on the central design time repository when creating messages to send to other systems and processing messages received from other systems. Thus, the central design time repository may be used as a hub for sending and receiving messages, where the metadata in the repository system is used to format outbound messages and process inbound messages between systems.

For example, if a CRM application wants to send a central design time repository based sales order confirmation to another application in the ERP system, the metadata in the central design time repository may be used to specify and identify data that may be transmitted to the other application as part of message. The other application receiving this data may then extract relevant data from the transmitted data.

Figure 6:
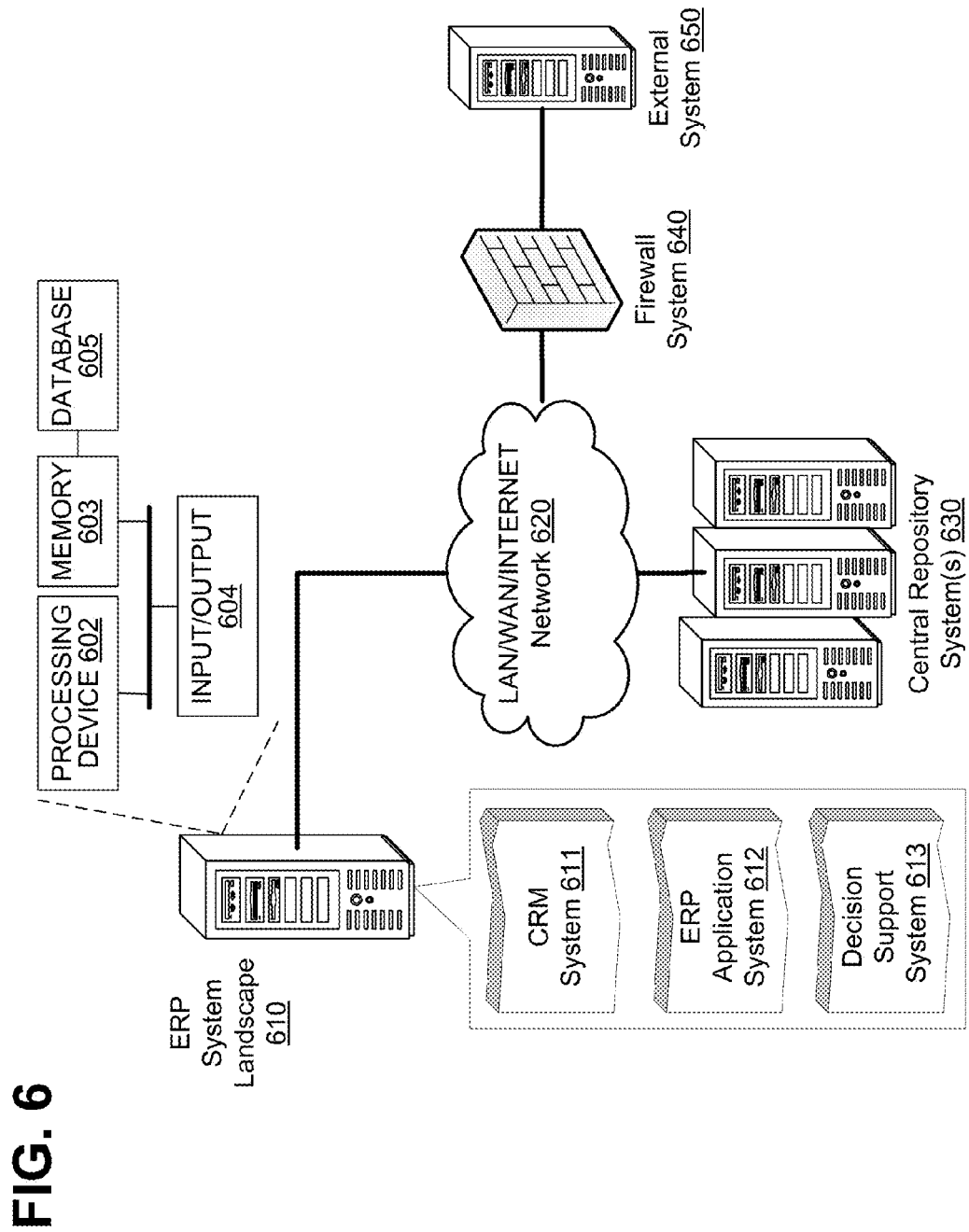
FIG. 6 illustrates an system configuration according to an example embodiment of the present invention.

FIG. 6 illustrates a system configuration according to an example embodiment of the present invention. In this example, an ERP system landscape operated on one or more first computer systems 610 may be coupled to a central design time repository operated on one or more second computer systems 630 through a communications network 620 and an external application running on an external computer system 650 through the communications network 620 and a firewall system 640. The external system 650 may be a third party system, such as a system belonging to a customer, supplier, transportation provider, or other third party. The ERP system landscape may include other applications as well, such as CRM system 611, ERP application system 612, and decision support system 613. Each of these applications may be separate systems connected with the ERP system landscape 610 through the communications network 620. Alternatively, each of the systems 611 to 613 may be separate components of an integrated ERP landscape system. In some embodiments, the central design time repository 630 may also be included as part of the ERP system landscape. The external application may also be included as part of the ERP system landscape 610 in some embodiments.

The external computer system 650 may be connected to a firewall system 640 that may prevent the external application from directly accessing applications of the organization, including the ERP landscape, CRM 611, ERP application 612, decision support 613, and/or central design time repository. If the external application is under the control of the organization or is managed by a trusted third party, then it may bypass the firewall system 740 so that it may directly access the other applications of the organization.

Each of the computer systems in FIG. 6 may contain a processing device 602, memory 603 containing a database 605, and an input/output interface 764, all of which may be interconnected via a system bus. In various embodiments, each of the systems 610 to 613, 630, and 650 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 603 may contain different components for retrieving, presenting, changing, and saving data. Memory 603 may include a variety of memory devices, for example, Dynamic Random Access Memory (DRAM), Static RAM (SRAM), flash memory, cache memory, and other memory devices. Additionally, for example, memory 603 and processing device(s) 602 may be distributed across several different computers that collectively comprise a system.

Processing device 602 may perform computation and control functions of a system and comprises a suitable central processing unit (CPU). Processing device 602 may comprise a single integrated circuit, such as a micro-processing device, or may comprise any suitable number of integrated circuit devices and/or circuit boards working in cooperation to accomplish the functions of a processing device. Processing device 602 may execute computer programs, such as object-oriented computer programs, within memory 603.

Figure 7:
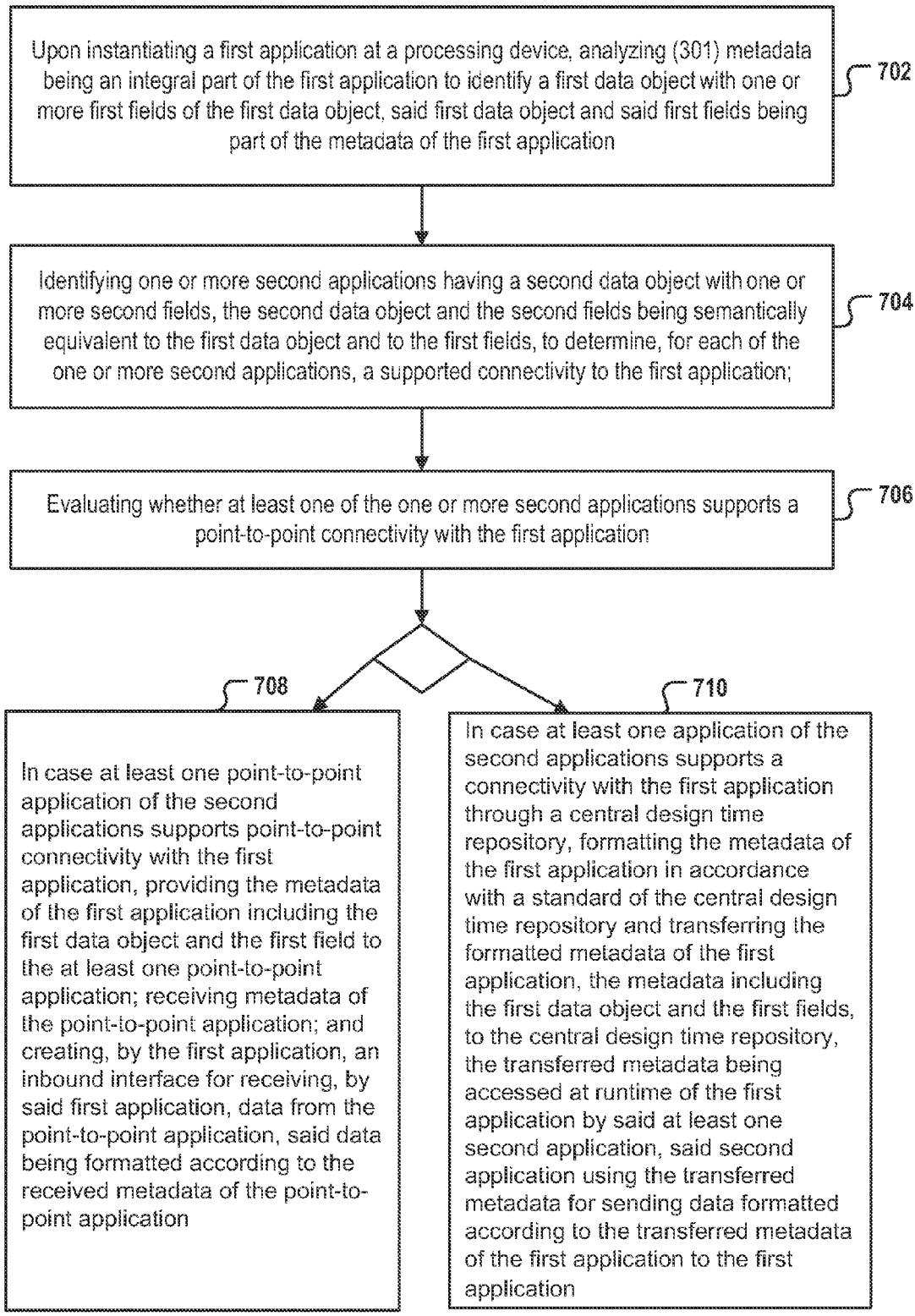
FIG. 7 illustrates a flowchart of a method enabling a first application to communicate with one or more second applications according to an example embodiment of the present invention.

FIG. 7 illustrates a flowchart of a method enabling a first application to communicate with one or more second applications according to an example embodiment of the present invention. In step 702, upon instantiating the first application at a processing device, the metadata of the first application is analyzed. The metadata of the first application comprises a first data object with one or more first fields. In step 704, one or more second applications which comprise a second data object comprising one or more second fields being semantically equivalent to the first data object and its first fields are automatically determined. In a succeeding step 706, it is evaluated whether at least one of the one or more second applications supports a point-to-point connectivity with the first application. In case at least one point-to-point application of the second applications supports a point-to-point connectivity with the first application, in step 708 the metadata of the first application including the identified first data object and first fields is provided to the at least one point-to-point application. The first application receives metadata of the point-to-point application and creates an inbound interface for receiving data from the point-to-point application, the data being formatted according to the received metadata of the point-to-point application.

In case it is determined that the at least one application of the second applications supports a connectivity with the first application through a central design time repository, in step 710 the metadata of the first application is formatted in accordance with a standard of the central design time repository and is transferred to the central design time repository. The transferred formatted metadata includes the first data object and the first fields being semantically equivalent to the identified second data object and second fields.

Figure 8:
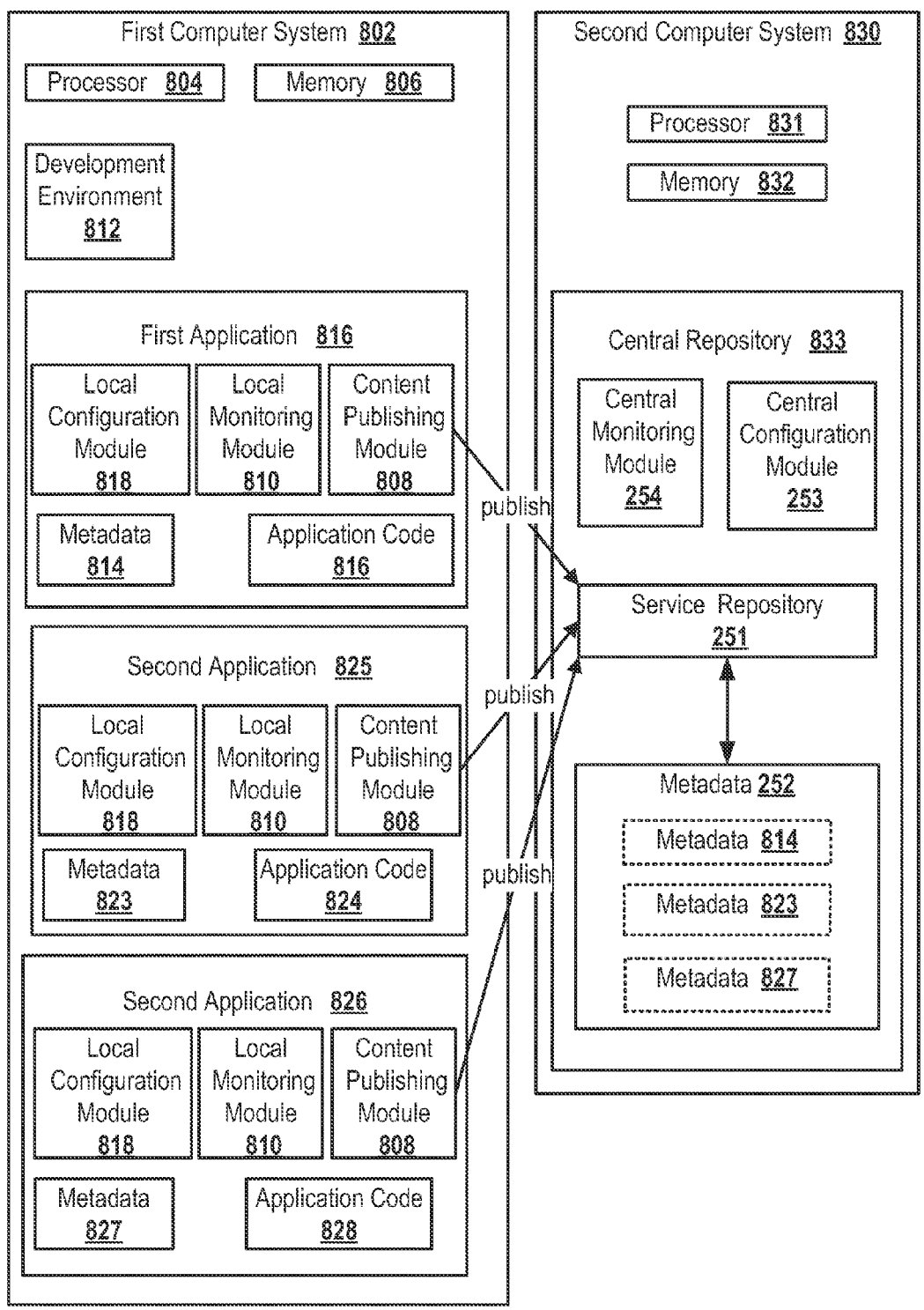
FIG. 8 illustrates a block diagram of a distributed system landscape according to an example embodiment of the present invention.

FIG. 8 illustrates a block diagram of a distributed system landscape according to an example embodiment of the invention. A first computer system 802 comprises a processor 804 and a memory 806. The first computer system may further comprise a development environment 812 for developing one or more applications 816, 825 and 826 or for modifying any of that applications having been received from a third party computer system. The first computer system 802 is connected to a second computer system 830 via a network (not shown). The second computer system also comprises a processor 831 and a memory 832. The second computer system further comprises a central repository 833 comprising a central monitoring module 254, a central configuration module 253 and a service repository 254 corresponding to the module is depicted in FIG. 2. The service repository 251 is operable to access metadata 252 comprising one or more copies of metadata 814, 823 and 827 having been published by one or more applications 816, 825 and 826 via the respective content publishing modules 808. The local configuration module 818, 810 and 808 of the individual applications may respectively comprise configuration settings and may provide a user with means to edit and modify the settings.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

It will be apparent to those skilled in the art that various modifications and variations can be made in the system and method for determining a supported connectivity between applications of the present invention without departing form the spirit or scope of the invention. Thus, it is intended that the present invention cover the modifications and variations of this invention provided they come within the scope of the appended claims and their equivalents.

What is claimed is:

1. A computer-implemented method comprising:
analyzing metadata of a first application to identify a first data object and one or more first fields of the first data object, the first data object and the first fields being part of the metadata of the first application;
identifying one or more second applications having a second data object with one or more second fields;
selecting, for at least one of the second applications, a supported connectivity with the first application, the selection being between central design time repository based connectivity and point-to-point connectivity, wherein the central design time repository is connected remotely to the first application and the one or more second applications; and
responsive to the at least one of the second applications supporting connectivity with the first application through the central design time repository, reformatting the metadata of the first application according to a data structure of the central design time repository and transmitting the reformatted metadata of the first application, the metadata including the first data object and the first fields, to the central design time repository, the transmitted metadata being accessed at runtime to enable communication with the first application; and
when the second application supports point-to-point connectivity with the first application,
providing the metadata of the first application including the first data object and the first fields to the second application, wherein the metadata is stored in a hierarchical data structure comprising a first, a second, and a third level, the first level identifying a messaging object transmitted between the first and the second application, the second level identifying a data object having at least one data field, the data object and the at least one data field being transmitted as part of the messaging object, the third level comprising an association of each of the at least one data field with data to be transmitted;
receiving metadata of the second application; and
generating, by the first application, an inbound interface for receiving, by the first application, data from the second application, the data being formatted according to the received metadata of the second application.

2. The computer-implemented method of claim 1, wherein the metadata of the first application is stored in a WSDL format in the first application.

3. The computer-implemented method of claim 1, wherein the metadata of the first application or a copy of the metadata is stored in a WSDL format in the central design time repository.

4. The computer-implemented method of claim 1, wherein the metadata has the WSDL format, wherein a first copy of the metadata is stored in the first application and a second copy of the metadata is stored in the central design time repository, and wherein the second copy differs from the first copy in that the second copy also includes an indication of the first application that the second copy is derived from.

5. The computer-implemented method of claim 1, further comprising converting the metadata from a WSDL format of the first application into a format of the central design time repository before storing the metadata in the central design time repository.

6. The computer-implemented method of claim 1, wherein identifying the one or more second applications includes comparing application identifiers stored in a lookup table to determine whether each application supports point-to-point or central design time repository based connectivity.

7. The computer-implemented method of claim 1, wherein the identification of the one or more second applications comprises checking the second applications for an outbound point-to-point interface, the outbound point-to-point interface including the second data object and the second fields.

8. The computer-implemented method of claim 1, wherein the first and the second applications are operable in a point-to-point communication mode and in a central-design time based communication mode.

9. The computer-implemented method of claim 1, further comprising processing point-to-point communications executed through an outbound interface of the first application before sending the processed point-to-point communications from the outbound interface to the second application, the outbound interface filtering out at least some data not used by the point-to-point application, the data to be filtered out being determined by the outbound interface by evaluating the metadata received from the second application.

10. The computer-implemented method of claim 1, further comprising processing a point-to-point communication by the first application, the point-to-point communication being received from the second application through an inbound interface of the first application, the inbound interface extracting desired data from the received point-to-point communication, the inbound interface identifying the desired data in the received point-to-point communication for extraction.

11. A non-transitory computer-readable storage medium comprising computer-interpretable instructions which, when executed by a processor, cause the processor to execute the steps of claim 1.

12. The computer-implemented method of claim 1, wherein the metadata has the WSDL format, wherein a first copy of the metadata is stored in the first application and a second copy of the metadata is stored in the central design time repository, and wherein the second copy differs from the first copy in that the second copy also includes an indication of the first application that the second copy is derived from.

13. The computer-implemented method of claim 1, further comprising an inbound interface wherein point-to-point communication being received from the second application through the inbound interface of the first application, the inbound interface extracting desired data from the received point-to-point communication, the inbound interface identifying the desired data in the received point-to-point communication for extraction.

14. A computing device comprising:
a communications interface operable to connect the computing device to a remote central design time repository and a second computing device having a second application, wherein the second computing device is connected remotely to the central design time repository;
a first application operable, by a processor, to
analyze metadata of the first application to identify a first data object and one or more first fields of the first data object, the first data object and the first fields being part of the metadata of the first application;
identify one or more second applications having a second data object with one or more second fields;
select, for at least one of the second applications, a supported connectivity with the first application, the selection being between central design time repository based connectivity and point-to-point connectivity; and
responsive to the at least one of the second applications supporting connectivity with the first application through the central design time repository, reformat the metadata of the first application according to a data structure of the central design time repository and transmitting the reformatted metadata of the first application, the metadata including the first data object and the first fields, to the central design time repository, the transmitted metadata being accessed at runtime to enable communication with the first application; and when the second application supports point-to-point connectivity with the first application, first application
provides metadata of the first application including the first data object and the first fields to the second application, wherein the metadata is stored in a hierarchical data structure comprising a first, a second, and a third level, the first level identifying a messaging object transmitted between the first and the second application, the second level identifying a data object having at least one data field, the data object and the at least one data field being transmitted as part of the messaging object, the third level comprising an association of each of the at least one data field with data to be transmitted;
receiving metadata of the second application; and
generates an inbound interface for receiving, by the first application, data from the second application, the data being formatted according to the received metadata of the second application.

15. The computing device of claim 14, wherein the metadata of the first application is stored in a WSDL format in the first application.

16. The computing device of claim 14, wherein the metadata of the first application or a copy of the metadata is stored in a WSDL format in the central design time repository.

17. The computing device of claim 14, wherein the metadata is converted from a WSDL format of the first application into a format of the central design time repository before storing the metadata in the central design time repository.

18. The computing device of claim 14, wherein a lookup table is used to determine the supported connectivity.

19. The computing device of claim 14, wherein the identification of the second application further includes checking the second application for an outbound point-to-point interface, the outbound point-to-point interface including the second data object and the second fields.

20. The computing device of claim 14, wherein the first and the second applications are operable in a point-to-point communication mode and in a central-design time based communication mode.

21. The computing device of claim 14, further comprising an outbound interface wherein point-to-point communications executed through the outbound interface of the first application are processed before sending the processed point-to-point communications from the outbound interface to the second application, the outbound interface filtering out at least some data not used by the point-to-point application, the data to be filtered out being determined by the outbound interface by evaluating the metadata received from the second application.

\* \* \* \* \*